United States Patent

[11] 3,609,750

| [72] | Inventors | Lee A. Budd |
| | | Pittsford, N.Y.; |
| | | Dan J. Schott, Phoenix, Ariz. |
| [21] | Appl. No. | 728,418 |
| [22] | Filed | May 13, 1968 |
| [45] | Patented | Sept. 28, 1971 |
| [73] | Assignee | Sperry Rand Corporation |

[54] GAS DISCHARGE BEARING DISTANCE HEADING INDICATOR
8 Claims, 6 Drawing Figs.

[52] U.S. Cl. .................................................. 340/336,
313/109.5, 313/210, 315/84.6
[51] Int. Cl. ..................................................... H01j 17/04
[50] Field of Search ........................................ 313/109.5,
210; 315/84.6, 169; 340/336; 178/7.85, 7.83;
380/147, 311

[56] References Cited

UNITED STATES PATENTS

| 2,927,237 | 3/1960 | Lieb | 313/109.5 |
| 3,327,153 | 6/1967 | Bickmire | 313/109.5 |
| 3,327,154 | 6/1967 | Bowerman | 313/210 |
| 3,302,052 | 1/1967 | Schwab | 313/109.5 |
| 3,376,452 | 4/1968 | Lally | 315/169 |
| 3,456,152 | 7/1969 | Andersen | 313/109.5 |
| 3,466,498 | 9/1969 | De Koster | 315/84.6 |
| 3,500,121 | 3/1970 | De Koster | 315/84.6 |
| 2,874,377 | 2/1959 | Lawlor | 178/7.85 |

FOREIGN PATENTS

| 144,065 | 11/1951 | Australia | 178/7.83 |

*Primary Examiner*—Robert L. Griffin
*Assistant Examiner*—Joseph A. Orsino, Jr.
*Attorney*—S. C. Yeaton ABSTRACT: A cold cathode gas discharge lamp having a ring of radially directed cathode elements on an electrically insulating substrate underlying a pair of concentric transparent ring anodes of different diameter for displaying aircraft heading and aircraft bearing (with respect to ground radio transmitters), respectively. Additional cathode elements are placed inside the aforesaid cathode rings on the same substrate underlying a third transparent anode for the display of alpha-numeric (distance) and annunciator data. Selected ones of the cathodes and anodes are energized to cause localized glow discharges viewable through the anodes for representing desired data.

INVENTORS
LEE A. BUDD
DAN J. SCHOTT
BY
*Robert Haan*
ATTORNEY

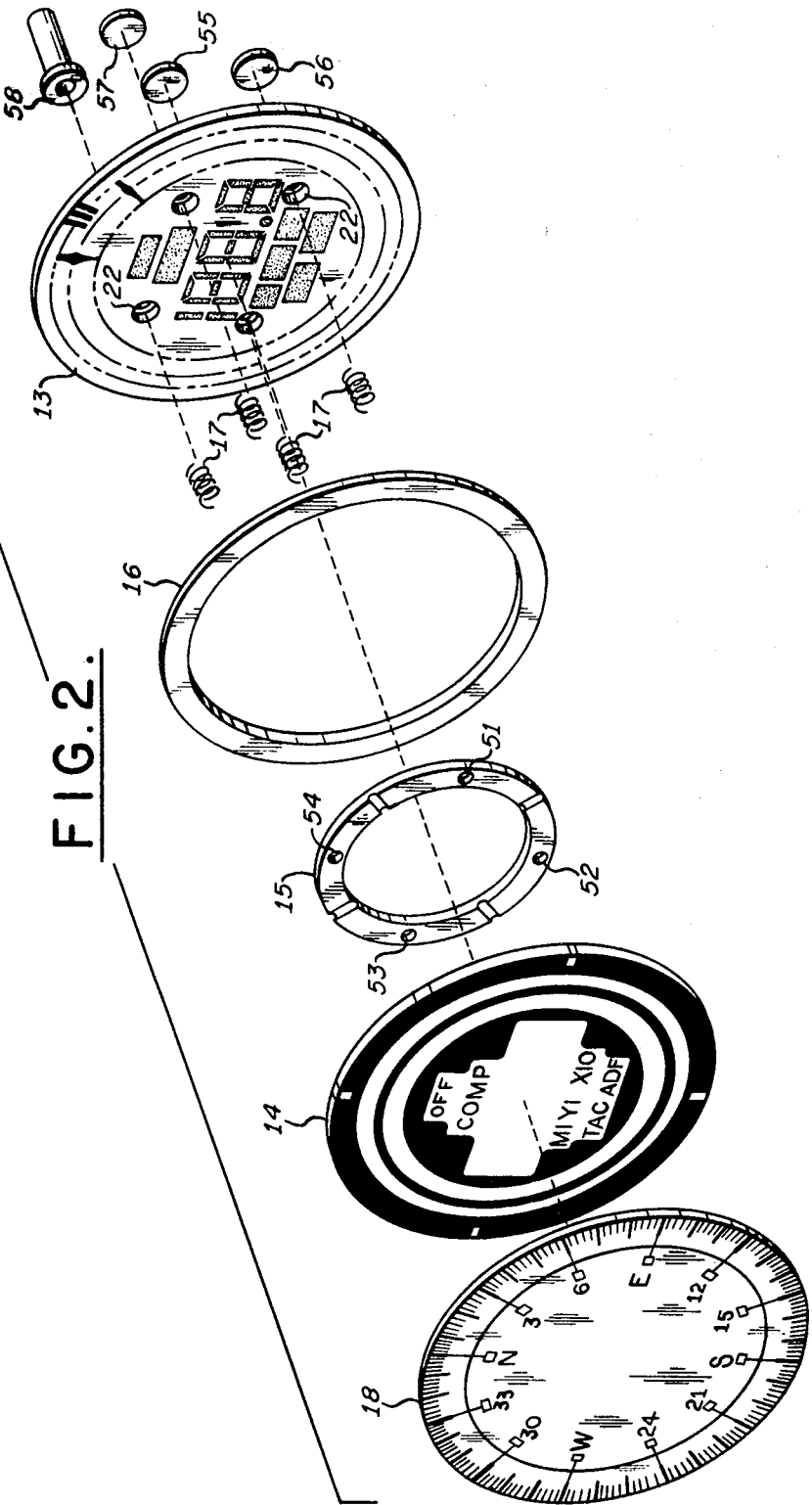

GAS DISCHARGE BEARING DISTANCE HEADING INDICATOR

BACKGROUND OF THE INVENTION

The present invention generally relates to aircraft indicators for the display of aircraft bearing, aircraft heading and distance relative to ground transmitting stations, and other flight data. Previously, electromechanical means have been utilized for the display of the aforementioned data. For example, heading and bearing data displayers were provided by rotatable compass cards and pointers, each of which was independently positionable. The relatively complex mechanical drivers and the driven elements themselves made it extremely difficult to combine a multiplicity of data indicators in one compact display package. In particular, the central region of the prior art electromechanical data display devices generally were unavailable for data display purposes because of physical inaccessibility. Recourse had to be had to undesirably large numbers of separate indicating instruments.

SUMMARY OF THE INVENTION

The present invention provides for the display of bearing, heading, distance and other flight data in a single gas discharge type of indicator having no mechanically moving parts. All of the potentially available display area is fully utilized including the central region which, by itself, contains an alpha-numeric indicator and seven mode annuciators. Bearing and heading data are displayed in adjacent rings surrounding the central area. Each unit of data is displayed by the glow discharge produced between a transparent anode (through which the glow is viewed) and a selectively energized cathode underlying the anode. All of the cathodes are formed on the same substrate. Three separate anode elements are provided for heading, bearing and all other data. The invention provides a compact, reliable and densely packed display of data which is readily interpreted and easily viewed under varying ambient light conditions. In addition, the all-solid-state design eliminates the major source of failures inherent in mechanical devices and provides significant advantages in terms of size, weight, power requirements, and maintenance. The sudden, unexpected failure typical of prior mechanical elements is replaced by a slow observable degeneration of light in the case of the present invention to minimize the likelihood of failure emergencies.

BRIEF DESCRIPTION OF THE DRAWINGS

FIG. 2 is an exploded view of the major components of a preferred embodiment;

DESCRIPTION OF THE PREFERRED EMBODIMENT

Figure 1A:
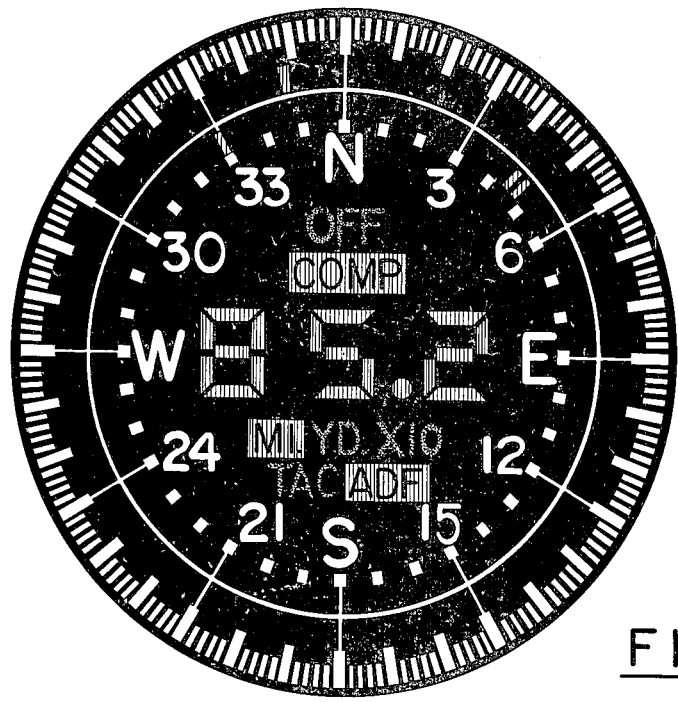
FIG. 1a is a sketch of a typical display provided by the present invention.
Figure 1B:
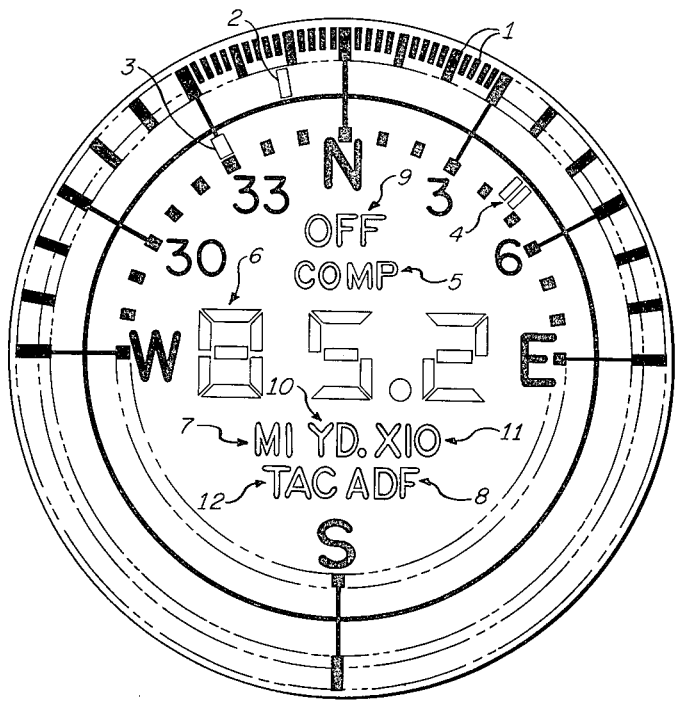
FIG. 1b is a simplified negative representation of FIG. 1a permitting legible leadline designation of the corresponding areas of FIGS. 1a and 1b.

Referring to FIGS. 1a and 1b, compass scale 1 consisting of marks spaced every 2° about the circumference of the indicator provides a reference for reading the heading indication 2 and the radio station bearing indications 3 and 4. Each of the indications 2, 3 and 4 is produced by a respective localized glow of ionized gas. The glows are separately positionable about a respective circular path on the display face. Indications 3 and 4 are positionable along the same circular path which is interior to the circular path of indication 2. Indication 4 comprises a pair of localized glows separated by an unlit element representing the direction of a known ground transmitting station. The pair of glows identify the station as against the single glow of indication 3 which represents a second known ground transmitting station. Thus, in the example of FIG. 1, aircraft heading is 348°, the bearing to one transmitting station is 330° while the bearing to the other ground station is 45°.

Compass scale 1 is observed by reflected ambient light against the dark face of the display. Said face is entirely dark except in the areas of the gas discharge glows of indications 2, 3 and 4 and in the areas of certain additional indications in the central region of the display. Provision is made in the preferred embodiment for eight additional indications in the center of the display. Four of the eight additional indications are visible in FIG. 1, namely, indications 5, 6, 7 and 8. Indication 6 is an alpha-numeric form while indications 5, 7 and 8 are simply glows which silhouette appropriate legends such as COMP, MI., and ADF. Indications 9, 10, 11 and 12 also are available but are not energized and are only faintly visible in the example of FIG. 1. Each indication is produced by a respective cold cathode discharge between a selectively energized anode and cathode, the cathodes associated with indications 9, 10, 11 and 12 not being energized in the example given.

The major elements of the preferred embodiment are shown in the exploded view of FIG. 2. Briefly, the present display comprises an electrically insulating substrate 13 upon which many cathode elements are deposited and an electrically insulating substrate 14 on which three transparent anode elements are formed. Substrates 13 and 14 are spaced apart by shims 15 and 16 and assembled in an hermetically sealed relationship to contain an ionizable gas between substrates 13 and 14. Electrical contacts to the cathode and anode elements are brought through substrate 13 with the exception of the contacts to the cathode element ring and the contact to the outermost anode element on substrate 14. Electrical contact to the inner pair of anode elements on substrate 14 is made through conductive springs 17 which pass through substrate 13. Substrates 13 and 14 may consist of glass plate material. Contrast filter 18 consists of optically circularly polarized material upon which the compass scale markings are inscribed.

Figure 3:
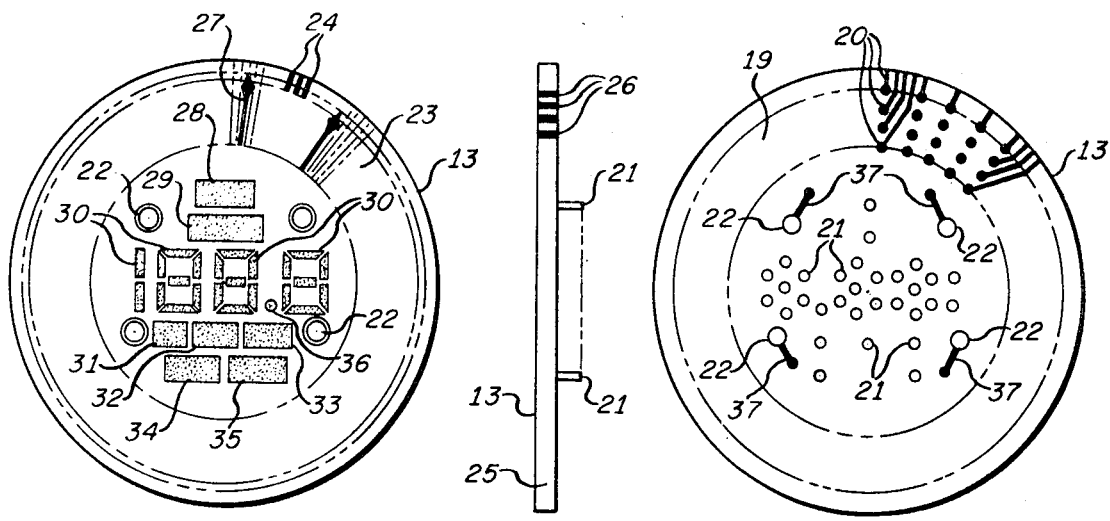
FIG. 3 is a series of views of the cathode plate member of the embodiment of FIG. 2.

Referring now to FIG. 3, surface 19 of substrate 13 is prepared by a silk screening process to form contact tabs 20 and contact tabs 37 in the indicated patterns. A series of hermetically sealed feed-through pins 21 are placed through the central region of the substrate and four counterbored holes 22 are drilled. On the opposite side of the substrate, surface 23 is prepared by a similar silk screening process to form contact tabs 24 in the indicated pattern about the perimeter of substrate 13. Each of the tabs 24 is electrically connected to a respective one of the tabs 20 on the reverse surface 19 of substrate 13 by placing a thin conductor across the edge 25 of substrate 13 in the fashion of conductors 26. Conductors 26 may be formed, for example, by hand painting using a conductive paint. At the same time, it is convenient to conductively paint the linings of holes 22 so that said linings are conductively connected to tabs 37. After the edge conductors 26 are formed, cathode elements 27 are deposited on surface 23. Cathode material also is deposited in areas 28, 29, 30, 31, 32, 33, 34, 35 and 36 for the annunciators and the alpha-numeric indications. Each of the areas 28-36 is in contact with a respective one of the feed-through pins 21. It will be noted that a total of 24 separate cathode areas are utilized in the alpha-numeric portion alone of the display; two areas are used for the first figure, seven areas are used for each of the three remaining figures, and one area is used for the decimal point.

Figure 4:
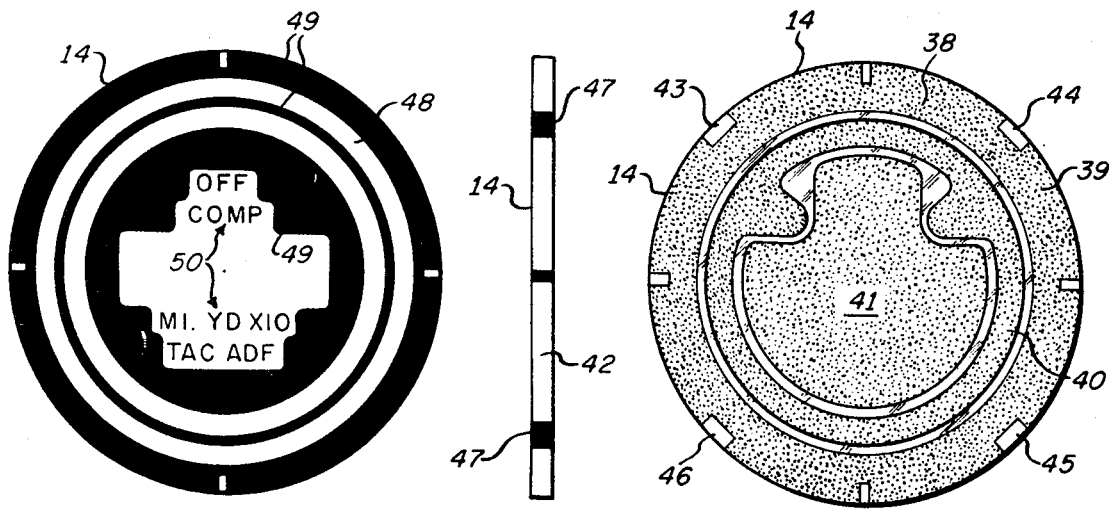
FIG. 4 is a series of views of the anode plate member of the embodiment of FIG. 2.

The anode plate member of the indicator of FIG. 2 is shown in more detail in FIG. 4. As in the case with the cathode plate member, glass plate may be used for the anode plate member. It is important that all of the glass parts have substantially the same coefficient of expansion so as to eliminate thermally induced strains after the unit has been hermetically sealed. Surface 38 of anode plate 14 is selectively covered as shown with transparent conductive layers 39, 40 and 41. Tin oxide is suitable material for layers 39-41. Layer 39 cooperates with cathode elements 27 of plate 13 to provide the indication 2 of FIG. 1. Layer 40 cooperates with the same cathode elements 27 to provide indications 3 and 4 of FIG. 1. It is to be noted that anode layers 39 and 40 are electrically separated from each other by the insulating property of the glass plate 14. Layer 41 cooperates with cathode areas 28-36 of plate 13 to provide indications 5, 6, 7 and 8 of FIG. 1. It should also be noted that layer 41 is electrically separated from layers 39 and 40.

The edge 42 and surface 38 of plate 14 are coated with electrically conductive material 43, 44, 45, 46 and 47 so that electrical connections may be made to layer 39 via the circumference of plate 14. Electrical connections to layers 40 and 41 are established by conductive springs 17 of FIG. 2. Surface 48 of plate 14 is painted black in the shaded areas 49 to provide background contrast and to mask undesired stray light for viewing the glow displays. The areas of glow inherently are confined to the contours of the energized cathode areas. Consequently, there is no need for any mask to define the shape of the glows. Masking is provided by the black paint in the legends 50 which are viewed (see indications 5, 7 and 8 of FIG. 1) in silhouette against the background illumination of respective gas discharge glows. Where there is no background glow discharge, the legends 50 are substantially unobservable as shown by the faint indications 9, 10, 11 and 12 of FIG. 1.

In the final assembly of the indicator shown in the exploded view of FIG. 2, spacer shim 15 is placed in contact with surface 38 of anode plate 14 and affixed thereto by applying cement in the four shim holes 51, 52, 53 and 54. The slots in this shim permit ionizable gas to flow from the inner to the outer envelope. Then, anode contact springs 17 are placed into holes 22 of cathode plate 13. Holes 22 are counterbored to provide shoulders for retaining springs 17 when the unit is assembled. Shim 16 is positioned centrally between anode and cathode plates 14 and 13 which are then brought together compressing springs 17. The subassembly comprising plates 13 and 14, shims 15 and 16 and spring 17 is placed into an assembly holding fixture. The edge of the subassembly is sealed with an hermetic glass sealing compound at the same time that sealing caps 55, 56 and 57 and fill-tube 58 are sealed to cathode plate 13. The sealing compound is applied to the edge of the subassembly so that the four connector tabs 47 of edge 42 of anode plate 14 are left uncovered. Next, the subassembly is placed into a furnace to fire and set the hermetic glass sealing material.

Figure 5:
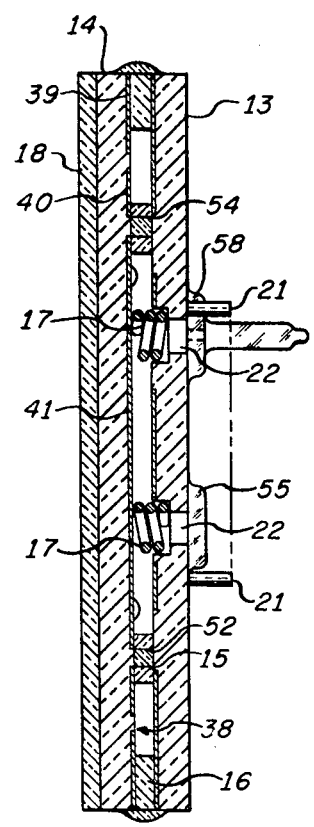
FIG. 5 is a cross-sectional view of the assembled components of FIG. 2.

After hermetic sealing, the space between plates 13 and 14 is filled with an ionizable gas via fill-tube 58 which is then sealed off. The black pattern 49 is silk screened on surface 48 of anode plate 14 after the firing of the subassembly. Finally, the contrast filter 18 is cemented to face 48 of anode plate 14 of the subassembly by means of an adhesive. A cross-sectional view of the completed assembly is shown in FIG. 5.

In a typical application, the total data display of FIG. 1 has a diameter of about 3 inches. The consequent close packing of the 180 cathode elements 27 which are spaced every 2° about the perimeter of the indicator requires the taking of certain precautions to avoid premature indicator failure by the buildup of cathode-sputtered material between the cathode elements whereby one element is shorted to an adjacent element. It has been found that satisfactory cathode life results from the use of three successive vacuum depositions of about 500 Angstroms of nickel-chromium alloy, about 2,220 Angstroms of 50 percent nickel and 50 percent iron, and about 860 Angstroms of aluminum, respectively, to form each of the cathode elements. The term "cathode life" is a measure of the length of time to a cathode failure of any type including element shorting previously mentioned.

Electrical connections are made to the annunciator and alpha-numeric portions of the display by the feed-through pins protruding from surface 19 of cathode plate 13. Connections to the cathode elements are made via contact tabs 20. Connections to anodes 40 and 41 are made via spring 17 and tabs 37. Connection to anode 39 is made via conductive tabs 47.

While the invention has been described in its preferred embodiment, it is to be understood that the words which have been used are words of description rather than limitation and that changes within the purview of the appended claims may be made without departing from the true scope and spirit of the invention in its broader respects.

1. A gas discharge flight data indicator comprising
a first electrically insulating substrate having on one surface a segmented ring forming a plurality of cathode elements,
a second electrically insulating substrate having on one surface first and second concentric ring anodes cooperatively disposed relative to said cathode elements, said one surface of said first substrate and said one surface of said second substrate facing each other in a spaced-apart hermetically sealed relationship such that said first and second ring anodes are spatially superposed with respective portions of each of said cathode elements,
an ionizable gas in the space between said substrates, and
means for electrically energizing said cathode elements and said ring anodes to produce gas discharge glows at the energized cathode elements.

2. An indicator as defined in claim 1 and further including additional cathode elements on said one surface of said first substrate inside said ring of cathode elements, and
an additional anode on said one surface of said second substrate facing said additional cathode elements in spatially superposed relation therewith.

3. An indicator as defined in claim 1 and further including
a member of optically polarized material placed on the surface of said second substrate opposite to said one surface,
said polarized material having compass scale markings thereon for enabling reading relative thereto of bearing and heading data provided by the selectively energized cathode elements.

4. A gas discharge flight data indicator comprising
a first electrically insulating substrate having on one surface a segmented ring forming a plurality of cathode elements, including successive layers of nickel-chromium alloy, 50 percent nickel and 50 percent iron, and aluminum,
a second electrically insulating substrate having on one surface first and second concentric ring anodes cooperatively disposed relative to said cathode elements, said one surface of said first substrate and said one surface of said second substrate facing each other in a spaced-apart hermetically sealed relationship such that said first and second ring anodes are spatially superposed with respective portions of each of said cathode elements,
an ionizable gas in the space between said substrates, and
means for electrically energizing said cathode elements and said ring anodes to produce gas discharge glows at the energized cathode elements.

5. A gas discharge flight data indicator comprising
a first electrically insulating substrate having on one surface a segmented ring forming a plurality of cathode elements including successive layers of nickel-chromium alloy, 50 percent nickel and 50 percent iron, and aluminum,
said layer of nickel-chromium alloy being about 500 Angstroms thick, said layer of 50 percent nickel and 50 percent iron being about 2,220 Angstroms thick, and said layer of aluminum being about 860 Angstroms thick,
a second electrically insulating substrate having on one surface first and second concentric ring anodes cooperatively disposed relative to said cathode elements, said one surface of said first substrate and said one surface of said second substrate facing each other in a spaced-apart hermetically sealed relationship such that said first and second ring anodes are spatially superposed with respective portions of each of said cathode elements,
an ionizable gas in the space between said substrates, and
means for electrically energizing said cathode elements and said ring anodes to produce gas discharge glows at the energized cathode elements.

6. A gas discharge flight data indicator comprising first and second electrically insulating substrates hermetically sealed together in spaced-apart relation to form an enclosed region therebetween containing an ionizable gas, a pair of concentric ring anodes formed on the interior surface of said first substrate, a plurality of cathode segments annularly disposed on the interior surface of said second substrate such that one part of each of said cathode segments is positioned in cooperative relation with one of said ring anodes and the other part of each of said cathode segments is positioned in cooperative relation with the other of said ring anodes, and means for selectively applying electrical energization to said cathode elements and said ring anodes to produce gas discharge glows in the vicinity of the selected cathode elements.

7. A gas discharge flight data indicator comprising first and second electrically insulating substrates hermetically sealed together in spaced-apart relation to form an enclosed region containing an ionizable gas, a pair of concentric ring anodes formed on the interior surface of said first substrate, a plurality of cathode segments annularly disposed on the interior surface of said second substrate such that one part of each of said cathode segments is in spatially superposed relation with one of said ring anodes and the other part of each of said cathode segments is in spatially superposed relation with the other of said ring anodes, and means for electrically energizing said cathode elements and said ring anodes whereupon energization of one of said ring anodes and at least one selected cathode element a gas discharge glow is produced proximate said selected cathode for indicating aircraft heading and energization of the other of said ring anodes and at least one of said cathode elements produces a gas discharge glow proximate the latter for indicating aircraft bearing to a known location.

8. The apparatus of claim 7 further including additional cathode elements on the interior surface of said second substrate within said annularly disposed cathode elements, and an additional anode on the interior surface of said first substrate in cooperable relation with said additional cathode elements for providing aircraft operational data.